UNITED STATES PATENT OFFICE 2,497,028

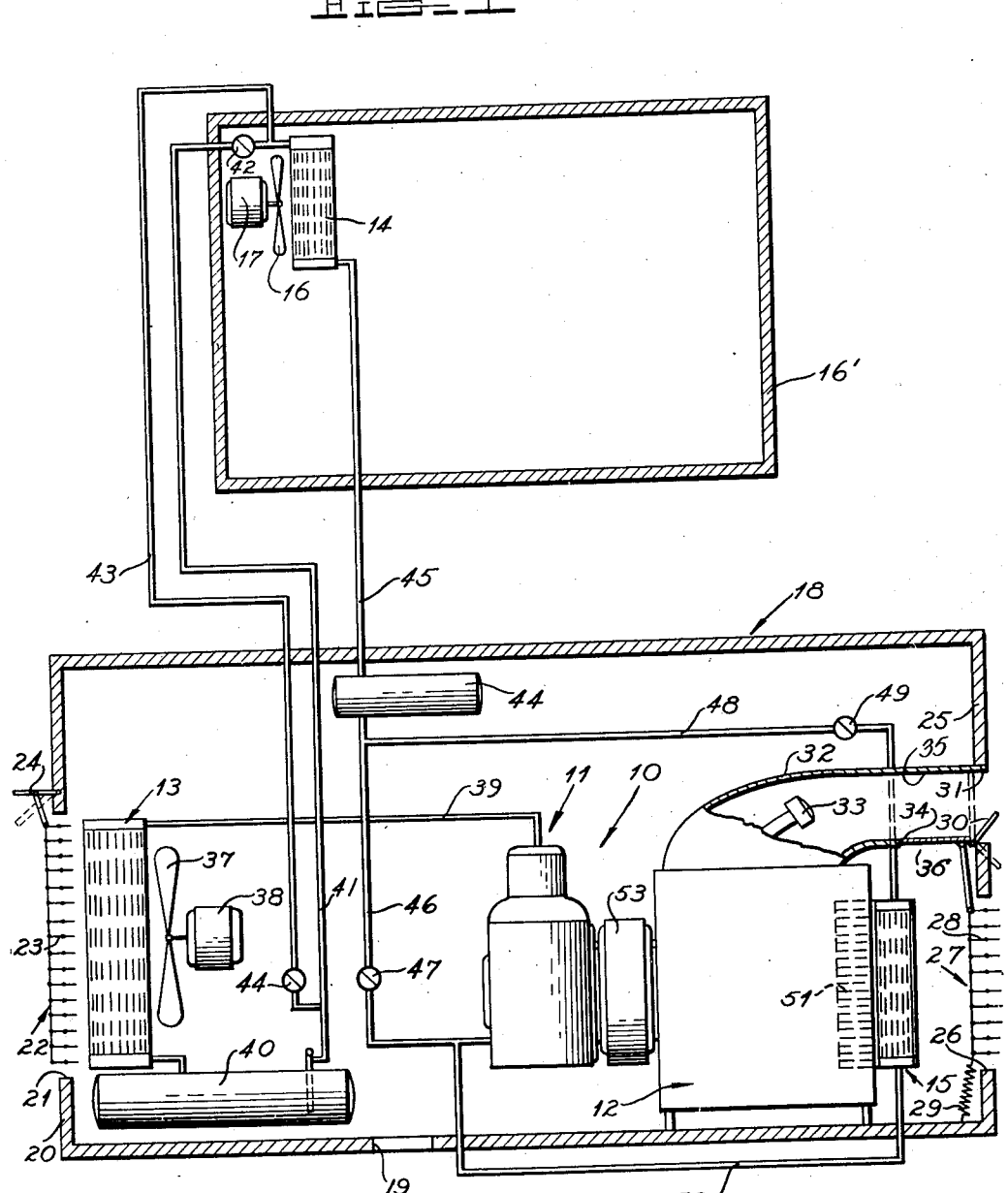

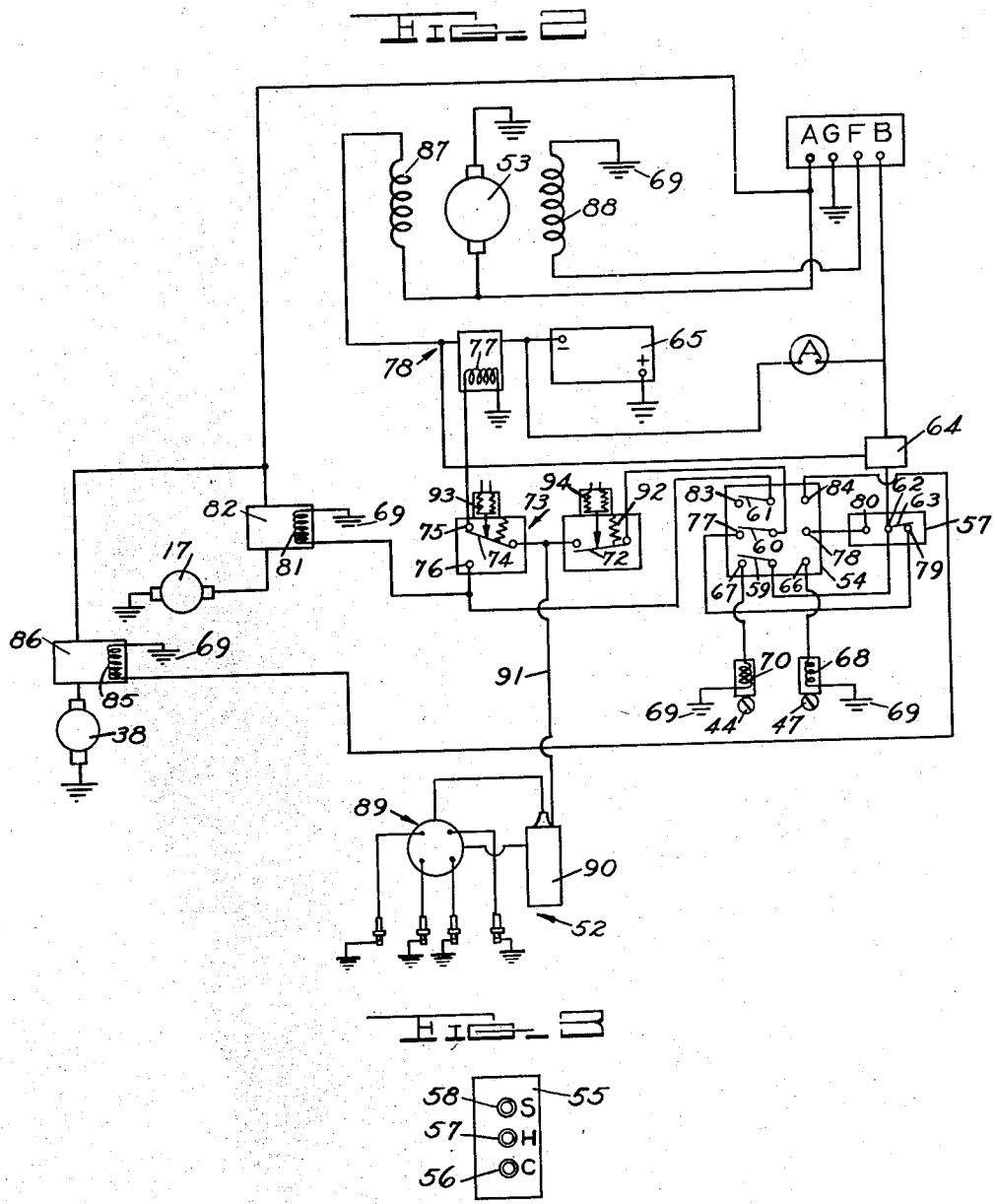

AIR CONDITIONING APPARATUS

Henry O. Kirkpatrick, Detroit, Mich., assignor to Advance Manufacturing, Inc., Detroit, Mich., a corporation of Michigan Application June 3, 1946, Serial No. 673,990

11 Claims. (Cl. 62—6)

This invention relates to air conditioning apparatus.

One of the objects of this invention is to provide air conditioning apparatus rendering it possible to more efficiently heat or cool the interior of an enclosure and maintain the atmosphere of the enclosure at a predetermined temperature.

Another object of this invention is to provide air conditioning equipment capable of being economically employed in practically all cases where it is desired to maintain the interior of an enclosure to a predetermined temperature and is especially adapted for installation on trucks, railway cars, buses, trailers and aircraft.

A further object of this invention is to provide air conditioning apparatus composed of a relatively few simple parts capable of being compactly arranged and readily controlled from a relatively simple centrally located panel.

Still another feature of this invention is to provide air conditioning apparatus embodying an internal combustion engine as the prime mover and constructed to employ the waste heat from the engine to improve the efficiency of the equipment.

A still further object of this invention is to provide air conditioning apparatus of the above general type having a heat exchange unit in the enclosure to be conditioned and connected in the system to selectively operate as an evaporator and a condenser.

The foregoing as well as other objects will be made more apparent as this description proceeds, especially when considered in connection with the accompanying drawing, wherein:

Figure 1 is a semi-diagrammatic view of air conditioning apparatus embodying the features of this invention;

Figure 2 is a wiring diagram of the control circuit; and

Figure 3 is an elevational view of the master control switch.

Upon reference to Figure 1 of the drawing, it will be noted that the reference character 10 designates generally air conditioning apparatus of the type adapted to cool or heat the atmosphere within an enclosure to maintain a predetermined temperature within the enclosures regardless of the temperature of the atmosphere outside of the enclosure. Briefly, the air conditioning apparatus comprises a refrigerant compressor 11, a prime mover in the form of an internal combustion engine 12 for operating the compressor, a refrigerant condenser 13, a heat exchange unit 14, and an evaporator 15.

The heat exchange unit 14 may be of any suitable construction capable of efficiently exchanging heat with the surrounding atmosphere and is suitably supported in an enclosure 16' containing the atmosphere which it is desired to maintain at a predetermined temperature. The air or atmosphere within the enclosure is circulated through the heat exchange unit 14 by a fan 16 supported at one side of the heat exchange unit, and driven by an electric motor 17.

The compressor 11, internal combustion engine 12, condenser 13 and evaporator 15 are suitably supported within a compartment 18 having an entrant opening for air 19 through the bottom wall thereof. One end wall 20 of the compartment 18 is formed with an opening 21 therethrough and the passage of air through this opening is controlled by a closure 22 comprising a plurality of louvres 23. The louvres are operatively connected to a control arm 24 pivotally supported on the wall 20 of the closure for convenient manipulation. The louvres 23 are shown in their open positions in Figure 1 of the drawing, and may be readily closed by merely swinging the arm 24 to its dotted line position shown in Figure 1 of the drawings. The opposite end wall 25 of the compartment 18 has an opening 26 therethrough, and the passage of air through the opening 26 is controlled by a closure 27 comprising a plurality of louvres 28 normally held in their open positions by means of a spring 29. A control arm 30 is suitably pivotally supported on the end wall 25 for convenient manipulation, and is operatively connected to the louvres 28 for closing the same. A second opening 31 is formed in the end wall 25 above the opening 26, and this opening communicates with an air duct 32 arranged adjacent the internal combustion engine 12 and surrounding the exhaust conduit 33 for the engine. An opening 34 is formed at the bottom of the delivery end portion 35 of the air duct, and the passage of air through this opening is controlled by a damper 36, which also serves to close the opening 31 when it is swung to its open position relative to the opening 34. The damper 36 is operatively connected to the arm 30 for operation by the latter. The arrangement is such that when the arm 30 is in its full line position shown in Figure 1 of the drawing, the damper 36 closes the opening 34 and the louvres 28 are in their open positions. On the other hand, when the arm 30 is swung to its dotted line position to close the louvres 28, the damper 36 is swung upwardly to open the opening 34 and to close the opening 31.

The refrigerant condenser 13 may be of any suitable construction capable of efficiently condensing the refrigerant in the compartment 18 immediately adjacent the opening 21. Air is drawn into the compartment 18 through the opening 19 and is forced through the condenser 13 out of the compartment by a fan 37. The fan 37 is suitably supported at the inner side of the condenser 13 and is driven by an electric motor 38. The upper end of the condenser 13 is connected to the high pressure side of the compressor 11 by a conduit 39, and the lower end of the condenser 13 is connected to a receiver tank 40. The receiver tank 40 is suitably supported in the compartment 18 below the condenser 13 and is connected to the receiving or upper end of the heat exchange unit 14 by a conduit 41. An expansion valve 42 is connected in the conduit 41 adjacent the receiving end of the heat exchange unit 14 in accordance with conventional practice. The expansion valve 42 is bypassed by a conduit 43 and a valve 44 is suitably connected in the bypass. The lower or return end of the heat exchange unit 14 is connected to an auxiliary receiver tank 44 by a conduit 45. The auxiliary receiver tank 44 is suitably supported in the compartment 18 and is connected to the low pressure sides of the compressor 11 by a conduit 46. A control valve 47 is connected into the conduit 46 between the receiver tank 44 and compressor 11.

The evaporator 15 may also be of any accepted design and is supported in the compartment 18 adjacent the opening 26 through the wall 25 of the compartment. The upper or receiving end of the evaporator 15 is connected to the conduit 46 by a conduit 48 and an expansion valve 49 is connected in the conduit 48. As shown in Figure 1 of the drawing, the conduit 48 is connected to the conduit 46 between the auxiliary tank 44 and the valve 47. The return or lower end of the evaporator 15 is connected to the low pressure side of the compressor by a conduit 50.

The internal combustion engine 12 is supported at the inner side of the evaporator 15, and is provided with a fan 51 for drawing air through the evaporator. As will be more fully hereinafter described, the internal combustion engine is equipped with the usual ignition means 52, and is also provided with an electric starting motor 53.

The air conditioning apparatus described above is controlled from a central panel by the control circuit diagrammatically shown in Figure 2 of the drawing. This control circuit comprises a three-pole double-throw switch 54 having a panel 55 provided with three push buttons indicated in Figure 3 of the drawing by the reference characters 56, 57 and 58. As will be presently described, the apparatus may be operated to lower the temperature of the atmosphere in the enclosure 16' by pushing the button 56, and may be operated to raise the temperature of this atmosphere by pushing the button 57. The button 58 may be operated to discontinue the operation of the air conditioning apparatus. The operation of the apparatus may also be interrupted by a double-throw switch 57' and the latter, in turn, is automatically operated by a thermostat suitably supported in the enclosure 16', so as to be responsive to variations in temperature of the atmosphere within the enclosure.

The switch 54 has three movable contact blades 59, 60 and 61. The terminal of the blade 59 is electrically connected to the terminal 62 for the movable contact blade 63 of the switch 57' and the terminal 62 is electrically connected to one side of a cranking limiter switch 64. The other side of the switch 64 is connected to the terminal B of a voltage regulator and is also connected to the negative pole of a suitable storage battery 65. The switch blade 59 is alternately engageable with the fixed contacts 66 and 67. The fixed contact 66 is connected to one end of a solenoid coil 68, and the opposite end of the coil is connected to the positive pole of the battery 65 through the ground 69. The solenoid 68 is operatively connected to the valve 47 and is adapted to open the valve 47 when the coil of the solenoid is energized. The terminal 67 of the switch 54 is electrically connected to one end of the solenoid coil 70 having the opposite end connected to the ground 69. The solenoid 70 is operatively connected to the valve 44 and is adapted to open this valve when the coil of the solenoid is energized.

The center terminal of the movable contact blade 60 is electrically connected to one side of a safety switch 72 having the opposite side connected to one side of a pressure switch 73. The switch 73 has a movable contact 74 which alternately engages contacts 75 and 76. The contact 75 is electrically connected to the solenoid coil 77 of the starter switch 78 and the contact 76 is electrically connected to the center terminal for the movable contact blade 61 of the switch 54.

The movable contact blade 60 alternately engages fixed contacts 77 and 78. The contact 77 is electrically connected to the fixed contact 79 of the thermostat operated switch 57' and the contact 78 is connected to the other terminal 80 of the thermostat operated switch 57'. As stated above, the center terminal of the movable contact blade 61 is electrically connected to the fixed contact 76 of the pressure switch 73 and is also electrically connected to one end of a solenoid coil 81 having the opposite end connected to the ground 69. The solenoid 81 is operatively connected to a switch 82 having one side electrically connected to the terminal A of the voltage regulator and having the other side connected to the motor 17 for the fan 16.

The contact blade 61 alternately engages fixed contacts 83 and 84. The fixed contact 83 is a blank contact and the contact 84 is electrically connected to one end of a solenoid coil 85 having the opposite end connected to the ground 69. The solenoid 85 is operatively connected to a switch 86 having one side connected to the terminal A of the voltage regulator and having the other side connected to the motor 38 for the condenser fan 37.

Upon reference to Figure 2, it will be noted that one side of the starter switch 78 is connected to the negative pole of the battery 65, and the other side of the starter switch is connected to one end of the coil 87 for the starting motor 53. The other end of the coil 87 is connected to the terminal A of the voltage regulator. A second coil 88 of the starting motor 53 is connected at one end to the ground 69 and is connected at the other end to the terminal F of the voltage regulator. With this arrangement, the starting motor may be employed as a generator during operation of the internal combustion engine to supply electric current to both the motors 17 and 38.

The distributing system of the internal combustion engine is indicated by the reference character 52 and comprises the usual distributor 89. The distributor 89 is electrically connected to the various spark plugs of the engine and is also connected to an ignition coil 90. The ignition coil 90 is electrically connected in the circuit to the pressure switch 73 by a conductor 91.

Operation

When it is desired to cool the atmosphere within the enclosure 16', the louvres 23 and 28 are opened. Manipulation of the control arm 30 to open the louvres 28 swings the damper 36 to its closed position with respect to the opening 34 and opens the opening 31. Also, the thermostat operated switch 57' is in a position wherein the movable contact 63 engages the fixed contact 80, so that the fixed contact 78 of the switch 54 is energized. The switch 54 is then operated by pressing the push button 56, with the result that the movable contacts 59, 60 and 61 are respectively engaged with the fixed contacts 66, 78 and 84.

As a result of the foregoing, the solenoid 68 is energized to open the valve 47, and the solenoid 70 is deenergized to permit the valve 44 to close. The safety switch 72 is normally closed by the spring 92, so that the ignition coil 90 is energized. Also, the pressure switch 74 is in a position wherein the fixed contact 75 is energized, so that the coil 77 of the starter switch 78 is also energized. As soon as the internal combustion engine is started, the pressure built up by the oil pump of the engine operates the pressure switch 73 to energize the fixed contact 76 and thereby closes the circuit to the motor 17 for the fan 18. It will further be noted that the contact 84 of the switch 54 is energized, and as a result, the switch 86 is closed by the solenoid 85 to operate the condenser fan motor 38.

It has been briefly stated above that the pressure switch 73 is operated by the oil pressure within the internal combustion engine. In this connection, attention is again directed to Figure 2 of the drawing wherein it will be noted that the movable contact 74 of the switch is connected to an expansible chamber 93 and the expansible chamber in turn is connected to the oil pump of the engine. The arrangement is such that when the engine is started, pressure is built up in the expansible chamber 93, and as the latter expands, it moves the switch contact 74 from the position shown in Figure 2 in engagement with the contact 75 to a position in engagement with the contact 76 to energize the solenoid 81. It was also stated above that the safety switch 72 is normally in its closed position. This safety switch is connected in series with the pressure switch 73 and also comprises an expansible chamber 94. The chamber 94 is connected to the condenser 13, so that if the pressure in the condenser should approach an abnormal quantity, the switch 72 is automatically opened by expansion of the chamber 94.

The compressor 11 is, of course, operated by the engine and discharges the gaseous refrigerating medium into the upper end of the condenser 13 through the conduit 39. The gaseous refrigerating medium is condensed by the air circulated through the condenser and the resulting high pressure liquid flows into the receiver tank 40. The liquid refrigerant flows from the receiver tank 40 through the conduit 41 to the expansion valve 42. As the refrigerant passes through the expansion valve 42, it expands into a low pressure mixture of gas and liquid. This mixture is discharged into the receiving or upper end of the heat exchange unit 14 and, as the mixture passes downwardly through the latter, it absorbs heat from the air being blown or forced through the heat exchange unit by the fan 18. As the mixture absorbs heat from the atmosphere within the enclosure 16, it is converted into a vapor and is still at relatively low pressure. The vapor is discharged from the heat exchange unit 14 through the conduit 45 to the auxiliary receiving tank 44 and passes through the conduit 46 to the low pressure side of the compressor 11. As stated above, the valve 47 has previously been opened, so that it does not restrict the passage of the vapor from the tank 44 to the compressor. In this connection it is pointed out that the expansion valve 49 is restricted, so that when the valve 47 is open, very little or no gas flows to the evaporator 15 on the suction stroke of the compressor. Therefore the evaporator 15 may be considered as inoperative during the cooling cycle and the heat exchange unit 14 may be considered as the evaporator.

It will also be noted that whenever the apparatus is operated on the cooling cycle, the fan 51 draws air through the opening 26 and through the evaporator 15. This air is directed in heat conducting relationship to the internal combustion engine to cool the same and is then discharged into the duct 32 with the exhaust gases or products of combustion. The air mixed with the products of combustion is discharged out of the compartment 18 through the opening 31.

The apparatus operates on the cooling cycle until the temperature within the enclosure 16' drops below a predetermined value determined by a suitable thermostat (not shown) within the enclosure. This thermostat in turn operates the switch 57', and the latter is connected in the circuit shown in Figure 2 of the drawing in such a manner that it automatically starts and stops the internal combustion engine in accordance with temperature fluctuations within the enclosure.

Assuming now that it is desired to heat the atmosphere within the enclosure 16', the operator merely depresses the push button 57 on the control switch 54. Also, the control arm 24 is operated to close the louvres 23 and the control arm 30 is operated to close the louvres 28. Closing of the louvres 28 effects a swinging movement of the damper 36 to its dotted line position shown in Figure 1 of the drawing where the opening 31 is closed and the duct 32 communicates with the space between the evaporator 15 and the louvres 28.

Operation of the switch 54 by manipulating the push button 57 energizes the solenoid coil 70 to open the valve 44 and, of course, deenergizes the solenoid coil 68 to permit the valve 47 to close. Also, the movable contact 63 of the switch 57' engages the stationary contact 79 to energize the latter, so that the ignition circuit and starter motor are operated in the same manner as previously described in connection with the cooling cycle. However, it is to be noted that the solenoid 85 is deenergized so that the switch 86 is open, and operation of the condenser fan 37 is discontinued.

When the motor is started, the compressor 11 discharges gaseous refrigerant under high pressure through the conduit 39 to the upper end of the condenser 13. This condenser, however, is inoperative due to the fact that no air is being circulated through the same, and as a result, the refrigerant passes through the tank 40 and through the bypass 43 to the receiving end of the heat exchange unit 14. In this connection It will be noted that the valve 44 is open to permit relatively free flow of refrigerant to the heat exchange unit, and since the expansion valve 42 is restricted, very little or no flow takes place in the conduit 41. As the gaseous refrigerating medium passes through the heat exchange unit 14, it gives up heat to the air being blown through the heat exchange unit by the fan 16, and in this respect, the heat exchange unit may be considered as a condenser. The condensed refrigerant is discharged from the heat exchange unit through the conduit 45 into the auxiliary tank 44 and since the valve 47 is closed, the refrigerant passes through the conduit 48 and expansion valve 49 to the upper end of the evaporator 15. As the refrigerant passes through the expansion valve 49, it is expanded, and the resulting low pressure mixture passes through the evaporator to the low pressure side of the compressor. As the mixture flows through the evaporator, it absorbs heat from the air and exhaust gases which are circulated through the evaporator by the fan 51 of the engine. The air passing through the evaporator is cooled and is then conducted into heat conducting relationship to the internal combustion engine. In this connection it will be noted that the opening 19 establishes permanent communication between the interior of the compartment and the atmosphere, so that exhaust gases cannot build up a pressure within the compartment. The air for mixture in the carburetor may be drawn into the compartment through a suitable flexible hose (not shown herein).

When the apparatus is operating on the cooling cycle, it may be necessary at times to defrost the heat exchange unit 14, because the latter is operating as an evaporator under such conditions. When it is desired to defrost the heat exchange unit 14, the operator merely depresses the push button 58 or stop button on the switch 54 to discontinue the cooling cycle. The button 57 on the switch 54 is then operated to initiate the heating cycle, and the apparatus is operated on the heating cycle until complete defrosting has been accomplished. It may be pointed out at this time that it is not necessary to disturb the louvres 23 and 28 during the defrosting operation, since enough heat will be absorbed from the air being drawn through the opening 31 and evaporator 15 by the engine fan 51.

What I claim as my invention is:

1. Air conditioning apparatus comprising a refrigerant compressor, means for operating the compressor, a condenser for the compressed refrigerant, an evaporator having a fluid connection with the condenser for receiving the condensed refrigerant and having a fluid connection with the low pressure side of the compressor, an expansion valve in the fluid connection between the condenser and evaporator, a bypass extending around the expansion valve and connected to the input side of the evaporator, a control valve for selectively opening and closing the bypass, and means for rendering the condenser inoperative when said control valve is in its open position.

2. Air conditioning apparatus comprising a refrigerant compressor, means for operating the compressor, a condenser for the compressed refrigerant, means for circulating air through the condenser for condensing the refrigerant, a heat exchange unit having a fluid connection with the condenser for receiving the condensed refrigerant and having a fluid connection with the low pressure side of the compressor, an expansion valve in the fluid connection between the condenser and heat exchange unit, a bypass extending around the expansion valve and connected to the input side of the heat exchange unit, a control valve in the bypass for selectively closing and opening the latter, and means for discontinuing circulation of air through the condenser when said control valve is in its open position.

3. Air conditioning apparatus comprising a refrigerant compressor, means for operating the compressor, a condenser for the compressed refrigerant, an enclosure for the condenser having louvre controlled openings in the wall opposite the condenser for the flow of air, means for forcing air through the condenser to condense the refrigerant, a heat exchange unit having a fluid connection with the condenser for receiving the condensed refrigerant and having a fluid connection with the low pressure side of the compressor, an expansion valve in the fluid connection between the heat exchange unit and condenser, a bypass extending around the expansion valve, a control valve for selectively opening and closing the bypass, and means for closing said louvres and discontinuing the operation of said air forcing means when said control valve is in its open position.

4. Air conditioning apparatus comprising a refrigerant compressor, means for operating the compressor, a condenser for the compressed refrigerant, a heat exchange unit having a fluid connection with the condenser for receiving the condensed refrigerant and having a fluid connection with the low pressure side of the compressor for returning refrigerant to the latter, an expansion valve in the fluid connection between the condenser and heat exchange unit, an evaporator having the receiving end connected to the return side of the heat exchange unit and having the delivery side connected to the low pressure side of the compressor, a valve controlled bypass extending around the expansion valve, a second valve in the return connection from the heat exchange unit to the compressor and located between the low pressure side of the compressor and the point of connection of the receiving end of the evaporator to the return side of the heat exchange unit, and means for selectively operating the bypass valve and said second valve to alternately open and close the same.

5. Air conditioning apparatus comprising a refrigerant compressor, means for operating the compressor, a condenser for the compressed refrigerant, a heat exchange unit having a fluid connection with the condenser for receiving the condensed refrigerant and having a fluid connection with the low pressure side of the compressor for returning refrigerant to the latter, an expansion valve in the fluid connection between the condenser and heat exchange unit, an evaporator having the receiving end connected to the return side of the heat exchange unit and having the delivery side connected to the low pressure side of the compressor, a valve controlled bypass extending around the expansion valve, a second valve in the return connection from the heat exchange unit to the compressor and located between the low pressure side of the compressor and the point of connection of the receiving end of the evaporator to the return side of the heat exchange unit, means for opening and closing the second valve upon successively closing and opening the bypass valve, and means rendering the condenser inoperative to condense refrigerant in the open position of the bypass valve and in the closed poition of the second valve.

6. Air conditioning apparatus comprising a refrigerant compressor, means for operating the compressor, a condenser for the compressed refrigerant, a heat exchange unit having a fluid connection with the condenser for receiving the condensed refrigerant and having a fluid connection with the low pressure side of the compressor for returning refrigerant to the latter, an expansion valve in the fluid connection between the condenser and heat exchange unit, an evaporator having the receiving end connected to the return side of the heat exchange unit and having the delivery side connected to the low pressure side of the compressor, a valve controlled bypass extending around the expansion valve, a second valve in the return connection from the heat exchange unit to the compressor and located between the low pressure side of the compressor and the point of connection of the receiving end of the evaporator to the return side of the heat exchange unit, means for selectively opening and closing the bypass valve, means for forcing air through the condenser rendered inoperative upon opening the bypass valve, and means for alternatively closing and opening the second valve upon successively opening and closing the bypass valve.

7. Air conditioning apparatus comprising a compartment having an opening through one wall, a refrigerant compressor in the compartment, an internal combustion engine for driving the compressor, an evaporator positioned in the compartment between the engine and one of said openings, means for drawing air through the said opening and evaporator and for directing the air in heat conducting relation to the engine, a duct for discharging the air through a second opening in the compartment and having an opening communicating with the space in the compartment between the evaporator and the first named opening, closure means for the first named opening movable to open and closed positions, and a damper for selectively closing the second opening and said duct opening.

8. Air conditioning apparatus comprising a compartment having an opening through one wall, a refrigerant compressor in the compartment, an internal combustion engine for driving the compressor, an evaporator positioned in the compartment between the engine and said opening, means for drawing air through the said opening and evaporator and for directing the air in heat conducting relation to the engine, a duct for discharging the air through a second opening in the compartment and having an opening communicating with the space in the compartment between the evaporator and the first named opening, closure means for the first named opening movable to open and closed positions, a common closure for the duct opening and the said second opening including a damper, and means responsive to movement of the closure means to open the first named opening to operate the damper to close the duct opening and responsive to movement of the closure means to close the first named opening to operate the damper to open the duct opening and close the second opening.

9. Air conditioning apparatus comprising a compartment having openings through one wall, a refrigerant compressor in the compartment, an internal combustion engine for driving the compressor, an evaporator positioned in the compartment between the engine and one of said openings, means for drawing air through the said one opening and evaporator and for directing the air in heat conducting relation to the engine, a duct for discharging the air through a second opening and having an opening communicating with the space in the compartment between the evaporator and said one opening, means for discharging the products of combustion into the duct, louvres for the said one opening movable to open and closed positions, and a damper responsive to opening said louvres to close the duct opening and responsive to closing the louvres to open the duct opening and close the said second opening.

10. Air conditioning apparatus comprising a compartment having first and second openings through opposite end walls and having a third opening through the bottom wall, a refrigerant compressor in the compartment, an internal combustion engine for driving the compressor, an evaporator positioned in the compartment between the engine and the first opening, a condenser supported in the compartment adjacent the second opening, means for drawing air into the compartment through the third opening and for forcing the air through the condenser and second opening, means for opening and closing the second opening, means for drawing air into the compartment through the first opening and evaporator and for directing the air in heat conducting relation to the engine, a duct for discharging air circulating in heat conducting relation to the engine into the atmosphere and having an opening communicating with the space in the compartment at the intake side of the evaporator, closure means for opening and closing the first opening, and a damper operable in the open position of the closure means to close the duct opening and operable in the closed position of the closure means to open the duct opening and close communication between the duct and the atmosphere.

11. Air conditioning apparatus comprising a refrigerant compressor, means for operating the compressor, a condenser for the compressed refrigerant, an enclosure for the condenser having an opening in the wall opposite the condenser for the passage of air, a heat exchange unit having a fluid connection with the condenser for receiving the condensed refrigerant and having a fluid connection with the low pressure side of the compressor, an expansion valve in the fluid connection between the heat exchange unit and the condenser, a bypass extending around the expansion valve, a control valve for selectively opening and closing the bypass, and means operable in timed relation to closing of the control valve to close the opening aforesaid in the enclosure.

HENRY O. KIRKPATRICK.

REFERENCES CITED

The following references are of record in the file of this patent:

UNITED STATES PATENTS

| Number | Name | Date |
|---|---|---|
| 2,069,201 | Allison | Feb. 2, 1937 |
| 2,318,858 | Hornaday | May 11, 1943 |
| 2,341,781 | Hornaday | Feb. 15, 1944 |
| 2,344,215 | Soling | Mar. 14, 1944 |
| 2,384,210 | Sunday | Sept. 4, 1945 |
| 2,443,500 | Goddard | June 5, 1948 |